United States Patent [19]

Berkovic et al.

[11] Patent Number: 5,434,699
[45] Date of Patent: Jul. 18, 1995

[54] METHOD AND SYSTEM FOR PRODUCING SECOND ORDER NONLINEAR OPTICAL EFFECTS USING IN-PLANE POLED POLYMER FILMS

[75] Inventors: Garry Berkovic; Valeri Krongauz; Schlomo Yitzchaik, all of Rehovot; Shlomo Yitzchaik, Holon, all of Israel

[73] Assignee: Yeda Research and Development Co., Ltd., Rehovot, Israel

[21] Appl. No.: 214,652

[22] Filed: Mar. 17, 1994

Related U.S. Application Data

[63] Continuation-in-part of Ser. No. 149,395, Nov. 9, 1993, abandoned, which is a continuation of Ser. No. 644,371, Jan. 23, 1991, Pat. No. 5,262,890.

[51] Int. Cl.⁶ .............................................. G02F 1/37
[52] U.S. Cl. ...................................... 359/328
[58] Field of Search ......................................... 359/328

[56] References Cited

U.S. PATENT DOCUMENTS

| 5,028,109 | 7/1991 | Lawandy | 359/328 |
| 5,037,582 | 8/1991 | Miyata et al. | 359/328 |
| 5,045,364 | 9/1991 | Fang | 359/328 |

OTHER PUBLICATIONS

Angyal, S. J. et al., *J. Chem. Soc. 1950*, "The Sommelet Reaction. Part III. The Choice of Solvent and the Effect of Substituents", pp. 2141–2145 (1950) (no month).
Esselin, S. et al., *SPIE 971*, "Second harmonic generation in amorphous polymers", pp. 120–127 (1988) (no month).
Hall, H. K., Jr. et al., *Macromolecules 22*, "New AB Polyesters and a Polymethacrylate Containing Dipolar p-Phenyleneazo Groups", pp. 3525–3529 (1989) (no month).
Meredith, G. R. et al, *ACS Symposium Series 233*, "Characterization of Liquid Crystalline Polymers for Electro-optic Applications", pp. 109–133 (1983) (no month).
D. J. Williams, Organic Polymeric and Non-Polymeric Materials with Large Optical Nonlinearities, Angew. Chem. Int. Ed. Eng. 23 (1984) 690–704 (no month).
J. Zyss, Nonlinear Organic Materials for Integrated Optics: a Review, Journal of Molecular Electronics vol. 1 25–45 (1985) (no month).
G. W. Gray, Molecular Structure and the Properties of Liquid Crystals, Department of Chemistry, Academic Press, England (1962) 1–21 (no month).

(List continued on next page.)

*Primary Examiner*—James W. Davie
*Attorney, Agent, or Firm*—Keck, Mahin & Cate

[57] ABSTRACT

Method for the generation of second order nonlinear optical effects, including second harmonic generation, which comprises the steps of:

i preparing a material in an xy planar film or xyz tridimensional form on a substrate and placing parallel electrodes on top of, inside, above or below said material, such that there is no protrusion of said electrodes into said material or a protrusion of at least one of said electrodes into said material is thinner than said material, wherein said material comprises at least one species of a hyperpolarizable component (a) and at least one species of a glass-forming organic material (b) providing a non-crystalline solid matrix in which molecules are not mobile, said components (a) and (b) being either distinct species or portions of a bifunctional molecule;

ii subjecting said material of step (i) to an electric field essentially along the x-axis thereof; and iii directing a beam of light to impinge on and to be transmitted through said material treated as in step (ii), thus generating second order nonlinear optical effects which are characterized by one or more $X^{(2)}$ components whose indices are zzz, zxx, zyy and permutations thereof.

18 Claims, 7 Drawing Sheets

OTHER PUBLICATIONS

S. Chandrasekhar, Liquid Crystals, Cambridge University Press, Bangalore (1977) 1–13 (no month).

Shvartsman et al., Quasi-Liquid Crystals of Thermochromic Spiropyrans. A Material Between Supercooled Liquids and Mesophases, J. Phys. Chem. 1984, 88, 6448–6453. (no month).

Cabrera et al., Physical Cross-Linking of Mesomorphic Polymers Containing Spiropyran Groups, Macromolecules 1987, 20, 2713–2717 (no month).

Cabrera et al., Dynamic Ordering of Aggregated Mesomorphic Macromolecules, Nature, vol. 326 9 Apr. 1987 (582–585).

Mortazavi et al., Second-Harmonic Generation and Absorption Studies of Polymer-Dye Films Oriented By Corona-Onset Poling At Elevated Temperatures, 1989 Optical Society of America, vol. 6, No. 4/Apr. 1989/J. Opt. Soc. Am.B (733–741).

Meredith, VanDusen, and Williams, Optical and Non-Linear Optical Characterization of Molecularly Doped Thermotropic Liquid Crystalline Polymers, Macromolecules 1982, 15, 1385–1389 (no month).

David J. Williams, Nonlinear Optical Properties of Organic Polymeric Materials, ACS Symposium Series 233 (1983) (no month) 109–133.

Yitzchaik et al., Second Harmonic Generation by Merocyanine Mesomorphic Films. An Anomalous Electrostatic Field Effect Chemistry of Materials 1990, 2, 1962–168 (no month).

Yitzchaik et al., A New Effect in Second Harmonic Generation by Poled Nematic Films. Adv. Mater 2 (1990) vol. 1 33–36 (no month).

Tom et al., Second-Harmonic Reflection from Silicon Surfaces and Its Relation to Structural Symmetry, vol. 51, No. 21, Physical Review Letters 1983–1986, 21 Nov. 1983.

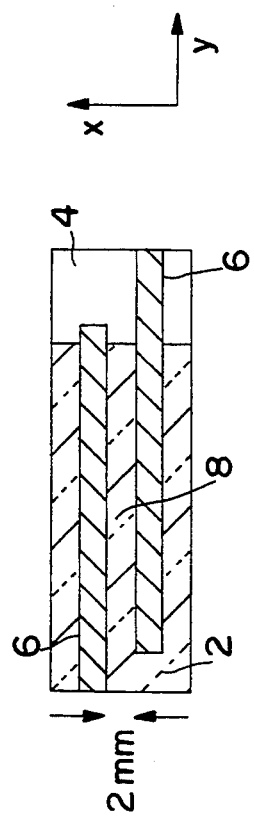
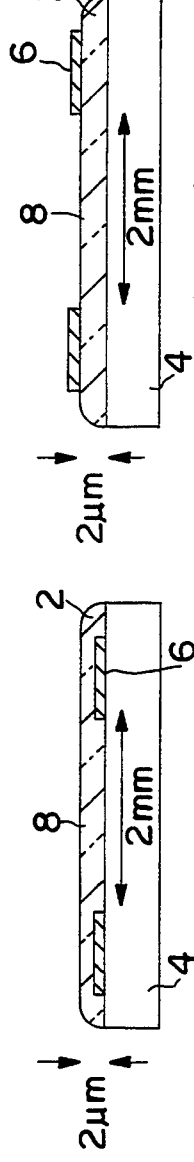
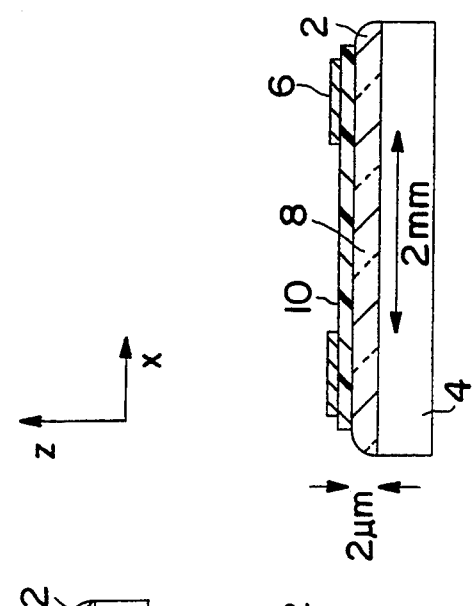

METHOD AND SYSTEM FOR PRODUCING SECOND ORDER NONLINEAR OPTICAL EFFECTS USING IN-PLANE POLED POLYMER FILMS

CROSS REFERENCE WITH OTHER APPLICATIONS

The present application is a continuation-in-part of U.S. application Ser. No. 08/149,395 filed on Nov. 9, 1993, now abandoned, which is a continuation application of U.S. Ser. No. 07/644,371, filed on Jan. 23, 1991, now U.S. Pat. No. 5,262,890.

FIELD OF THE INVENTION

The present invention relates to a system and a method for producing a novel and useful optical phenomenon, namely one characterized by the generation of second order nonlinear optical effects and in particular second order harmonic radiation including at least a component polarized perpendicular to the direction of an electric field imposed on a sample, through which incident radiation is transmitted and/or from which incident radiation is reflected.

BACKGROUND OF THE INVENTION

Poling a polymeric film containing dopant chromophore molecules or side-chain groups with high molecular hyperpolarizabilities ($\beta$) has become a widely used strategy for preparation of films with large second order optical nonlinearity exhibiting properties such as second harmonic generation (SHG) and electro-optic modulation. The usual method of film preparation involves applying a strong external electrostatic field (up to $10^6$ V/cm.) to a doped film heated to above its glass transition temperature ($T_g$), leading to a preferential alignment of dipolar chromophore groups along the field direction. Cooling to room temperature (below $T_g$) prior to removal of the field enables a "freezing in" of the net polar alignment. In practice, some residual molecular mobility is often retained, leading to a loss of the polar alignment over a period of time (ranging from minutes to months) which depends on both polymer matrix and chromophore properties.

Second order nonlinear optical processes such as SHG are described quantitatively by the second order susceptibility tensor $X^{(2)}$. Under the electric dipole approximation, a second-order polarization, $P^{2w}$ is induced by the incident (optical) electric field $E^w$ according to:

$$P^{2w}{}_i = X^{(2)}{}_{ijk} E^w{}_j E^w{}_k \qquad (1).$$

The observed second harmonic generation efficiency is proportional to the square of $P^{2w}$. From symmetry considerations, it is readily apparent from equation (1) that in a centrosymmetric medium all components $X_{ijk}=0$. Furthermore, in media symmetric about a plane $i=0$ all $X^{(2)}$ components containing the index $i$ either one or three times must similarly be zero. Thus in the case of a polymer poled by an electric field along the x direction as discussed above, the only nonzero components are:

$$X^{(2)}{}_{xxx}, X^{(2)}{}_{xyy}=X^{(2)}{}_{xzz}, \text{ and } X^{(2)}{}_{yxy}=X^{(2)}{}_{zxz}.$$

Such relationships between the various $X^{(2)}$ components of poled polymers have been found in various studies (see, e.g., Williams, D. J., Angew. Chem. Int., 1984, 23:690, and Esselin, S. et al., SPIE Conf. Proc., 1988, 971:120). It will be shown below, in accordance with one aspect of the present invention, how polymers can be poled so as to obtain additional nonzero $X^{(2)}$ components, arising from asymmetry not only along the poling direction (the x direction) but also in a direction z, which is perpendicular to the poling direction.

SUMMARY OF THE INVENTION

The present invention provides in one aspect a system for the generation of second order nonlinear optical effects and in particular second order harmonic radiation, which system comprises means for producing a beam of light and for directing the beam to impinge on and to be transmitted through and/or reflected from a material comprising first and second components, wherein the first component is a hyperpolarizable component (a) and the second component is a glass-forming organic material (b) providing a non-crystalline solid matrix in which said both of first and second components are immobilized, and which material is in a form selected from the group consisting of xy planar films, coatings and xyz 3-dimensional forms placed on a substrate, and parallel electrodes are placed on top of, inside, above or below said material, such that there is no protrusion of said electrodes into said material or a protrusion of at least one of said electrodes is thinner than said material, which material is adapted for the transmission and/or reflection of the beam of light, means for subjecting said material in such form to an electric field essentially along the x-axis thereof and means for detecting and measuring the second order nonlinear optical effects generated which are characterized by one or more $X^{(2)}$ components whose indices are, zzz, zxx, zyy and permutations thereof. The electric field may be a direct current (DC) or polarizing electric field, or an alternating current (AC) electric field.

In one embodiment the system is characterized by the facts that (a) when said material is in the form of an xy planar film or coating, the polarizing electric field means is adapted to apply the field on the xy plane of said film or coating essentially parallel to the x-axis thereof and the beam of light producing and directing means is adapted to cause the impingement of the beam on the planar film or coating at an angle other than normal to the xy plane, and (b) when the material is in 3-dimensional form, the polarizing electric field means is adapted to apply the field essentially parallel to a line which is arbitrarily defined as an x-axis of the 3-dimensional form and the beam of light producing means is adapted to provide a beam which includes components polarized along at least one of the y- and z-axes relative to the x-axis; and (c) the system includes means for effecting at least one operation selected from detecting, observing, measuring and utilizing second order harmonic radiation emergent from the material, the emergent radiation including at least one component which is perpendicular to the direction of polarization induced by the electric field in the at least one species of hyperpolarizable component.

In general terms, the material comprises at least one species of a hyperpolarizable component (a) and at least one species of a glass-forming organic material (b), said first and second components being present as separate distinct species in a composition, or each of said first and second components is present as a portion of a single bifunctional molecular species.

The present invention provides in another aspect a method for the generation of second order nonlinear optical effects and in particular second order harmonic radiation, which comprises the steps of:

i. preparing a material in an xy planar film or xyz tridimensional form on a substrate and placing parallel electrodes on top of, inside, above or below said material, such that there is no protrusion of said electrodes into said material or a protrusion of at least one of said electrodes into said material is thinner than said material, wherein said material comprises at least one species of a hyperpolarizable component (a) and at least one species of a glass-forming organic material (b) providing a non-crystalline solid matrix in which molecules are not mobile, said components (a) and (b) being either distinct species or portions of a bifunctional molecule;

ii. subjecting said material of step (i) to an electric field essentially along the x-axis thereof; and iii. directing a beam of light to impinge on and to be transmitted through said material treated as in step (ii), thus generating second order nonlinear optical effects which are characterized by one or more $X^{(2)}$ components whose indices are zzz, zxx, zyy and permutations thereof.

The material may be in an xy planar film, coating or 3dimensional form adapted for the transmission and/or reflection of the beam of light, and the method is further characterized by the facts that (a) when the material is in the form of an xy planar film or coating, the polarizing electric field is applied essentially parallel to the xy plane of the film or coating and the beam of light is caused to impinge on said planar film or coating at an angle other than normal to the xy plane, (b) when the material is in 3-dimensional form, the polarizing electric field is applied essentially parallel to a line which is arbitrarily defined as an x-axis of the 3-dimensional form and the beam of light includes components polarized along at least one of the y- and z-axes relative to the x-axis; and (c) the method includes the additional step of effecting at least one operation selected from detecting, observing, measuring and utilizing second order harmonic radiation emergent from the material, the emergent radiation including at least one component which is perpendicular to the direction of polarization induced by the electric field in the at least one species of hyperpolarizable component.

The present invention provides in a particular embodiment, a method for the generation of second order harmonic radiation, which comprises the steps of:

subjecting a material as defined above to a polarizing electric field essentially along an axis defined as an x-axis of the material;

producing a beam of light and directing the beam to impinge on and to be transmitted through and/or reflected from the material; and effecting at least one operation selected from detecting, observing, measuring and utilizing emergent radiation characterized by one of more $X^{(2)}$ components whose indices are zzz, zxx, zyy and permutations thereof.

The term "hyperpolarizable component" in the present specification and claims means a chemical compound or structural component thereof which exhibits nonlinear polarizability. By way of example, such a component may exhibit e.g. a different electronic dipole moment in the molecular ground and excited states; and/or intramolecular charge transfer or electron delocalization. For a fuller description, reference may be made, for example to Williams, D. J., Angew. Chem. Int. Ed. (1984) 23:690, and Zyss, J., J. Mol. Electronics (1985) 1:25, the disclosures of which are incorporated herein by reference.

The glass-forming organic material (b) should provide a non-crystalline solid matrix in which molecules are not mobile. It may itself be mesogenic or not. It may be, for example, a liquid crystal or an amorphous polymer or a low molecular weight glass-forming compound, such as the new compound 2',3'-dihydro-8-nitro-6-[4-(4'-hexyloxyphenylazo)-phenylcarbonyloxymethyl]-1',3',3'-trimethylspiro(2H-1-benzopyran-2,2')indole, hereinafter referred to as AzISP, which also forms part of the present invention.

The term "mesogenic component" in the present specification and claims means a chemical compound or structural component thereof which tends to cause the formation of liquid phase or amorphous structures which are not isotropic or random over a particular temperature range. For a fuller description, reference may be made, for example, to Gray, G. W., Molecular Structure and the Properties of Liquid Crystals, Academic Press, London 1967, and Chandrasekhar S., Liquid Crystals, Cambridge University Press, 1977, the disclosures of which are incorporated herein by reference.

BRIEF DESCRIPTION OF THE DRAWINGS

FIGS. 1A-F are top (1A) and side (1B-1F) views of the material geometries used for "in-plane" poling of polymer-dye films. Side views ape shown for samples: (1B) cast directly on glass slides, the parallel electrodes being placed inside the material; (1C) the "reverse geometry" with the parallel electrodes placed on top of the material (at the polymer/air interface); (1D) the glass substrate is pre-coated with a different substrate and the parallel electrodes are inside the material; (1E) the glass substrate is pre-coated with a different substrate and the parallel electrodes are placed in the coating, below the material; (1F) the material is coated and the parallel electrodes are placed above the material, on top of the coating.

DETAILED DESCRIPTION OF THE INVENTION

Figure 2:
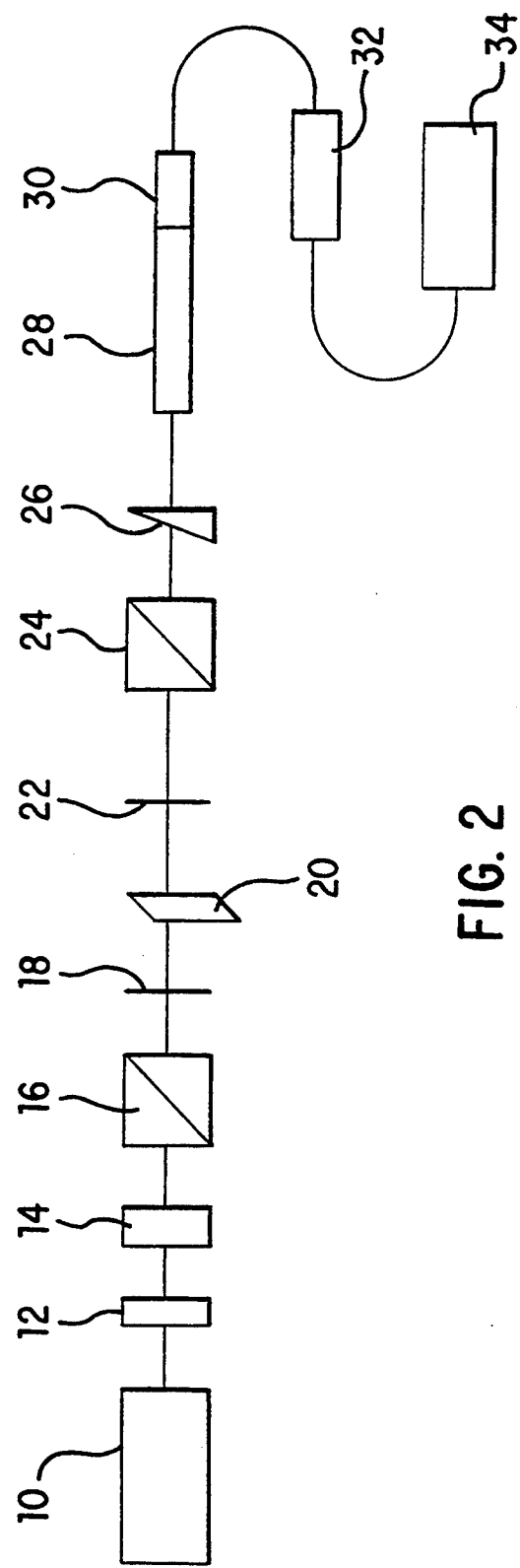
FIG. 2 illustrates a system for the generation of second order harmonic radiation in accordance with an embodiment of the invention.

In a particular embodiment of the system and method of the invention, in the light-transmitting and/or reflecting material, the organic glass-forming component may be present in the form of at least one compound selected from a first group consisting of monomeric and polymeric compounds, and the hyperpolarizable component may be present in the form of at least one compound selected from a second group consisting of monomeric and polymeric compounds, the members of the first being completely different from the members of the second group. Mesogenic glass-forming species may be homopolymers of 6-[4-(4-methoxyphenoxycarbonyl)phenoxyhexyl]acrylate and 6-[4-(4-cyanophenoxycarbonyl)phenoxyhexyl]acrylate, as well as copolymers of these monomers with each other and with other suitable comonomers such as alkyl acrylates and methacrylates, and acrylonitrile, provided of course that any resulting copolymer to be used for the purposes of the present invention has mesogenic characteristics. Amorphous glass-forming components may be polymethylmethacrylate (PMMA), polyacrylates, polystyrene (PS), polycarbonates (PC), polyvinylchloride (PVC) and polysulfones. Examples of the hyperpolarizable component are e.g. 4-dimethylamino-4'-nitrostilbene (DANS) as well as the quasi-crystalline materials of U.S. Pat. No. 4,405,733 and the merocyanine component thereof, the disclosure of this U.S. Patent being incorporated herein by reference.

In another embodiment of the system and method of the invention, in the light-transmitting and/or -reflecting material, the at least one species of glass-forming component and the at least one species of hyperpolarizable component are both present simultaneoulsy in at least one compound selected from a third group consisting of monomeric and polymeric compounds. Examples of this third group are e.g. the quasi-liquid crystal forming compounds disclosed in U.S. Pat. No. 4,927,917, the contents of this patent document being incorporated herein by reference. Another example is the photochromic liquid crystal polymer designated PLCP-1 in Table 1 herein, as well as an ethylenic copolymer containing side-chain units of 6-[4-(4-methoxyphenoxycarbonyl)phenoxyhexyl]acrylate and/or 6-[4-(4cyanophenoxycarbonyl)phenoxyhexyl]acrylate, as well as side-chain units of an ethylenic monomer (ECP) incorporating the 4-dimethylamino-4'-nitrostilbene structure (the acrylates to monomer ratio being e.g. 1:4 by weight). Mixtures of such quasi-liquid crystal forming compounds and photochromic polymers may also be used for this purpose and constitute a further embodiment of the invention. Such mixtures are exemplified below. It will be appreciated that one or more substances selected from this third group can also be admixed with one or more substances selected from the first group described above and/or one or more substances selected from the second group described above.

In the material of the invention which is a bifunctional polymer molecule, it is preferred that at least one of the following conditions is fulfilled, namely:

the at least one species of mesogenic component is present in a main chain of the at least one polymer: and/or the at least one species of hyperpolarizable component is present in a main chain of the at least one polymer; and/or the at least one species of mesogenic component is present in side chains of the at least one polymer; and/or the at least one species of hyperpolarizable component is present in side chains of the at least one polymer.

In a particular embodiment the material comprises a copolymer incorporating a hyperpolarizable component which may be prepared by copolymerization of at least one ethylenically unsaturated monomer having hyperpolarizable properties with at least one non-hyperpolarizable ethylenically unsaturated monomer, such as PLCP-1 and DR-PMMA copolymers described herein.

Figure 7:
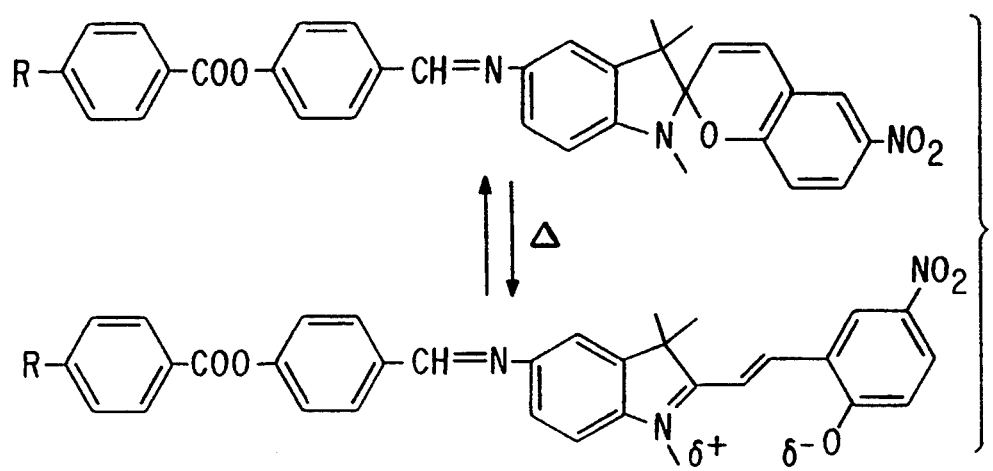
FIG. 7 depicts the formula of the quasi-liquid crystal compounds designated QLC-1 (R=OCH$_3$) and QLC-2 (R=OC$_6$H$_{13}$).

In another embodiment, the material comprises at least one quasi-liquid crystal component which comprises a spiro-compound depicted in FIG. 7 and chemically equivalent 2,2'-indoline-spiro(fused ring)pyran or 2,2'-indoline-spiro-(fused ring)1',4'-oxazine derivatives having quasi-liquid crystal properties.

Figure 6:
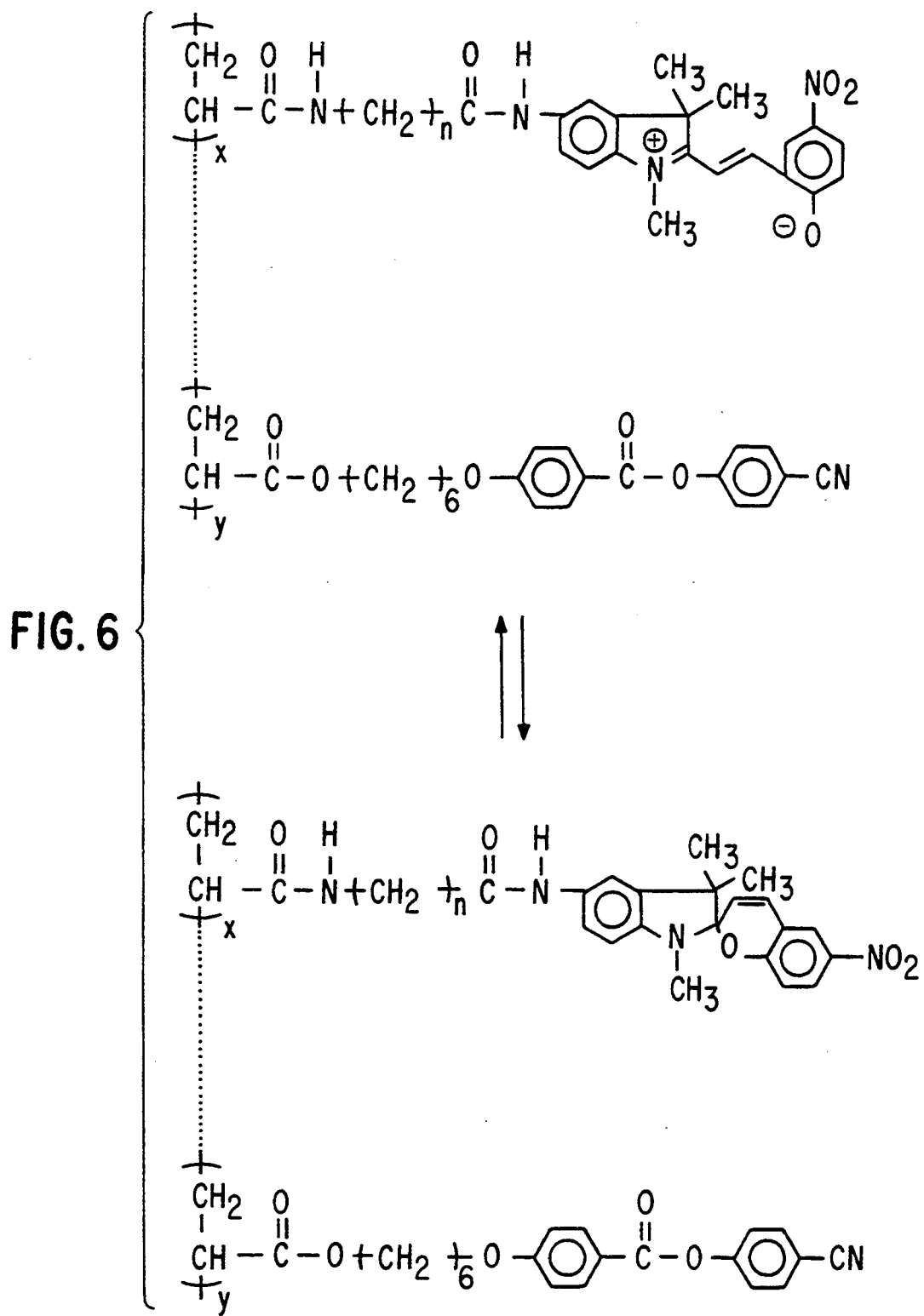
FIG. 6 depicts the formula of the photochromic liquid crystal polymer designated PLCP-1.

In yet another embodiment, the material comprises a quasi-liquid crystal component selected from the compound depicted in FIG. 7 herein wherein R is methoxy or hexyloxy, and a polymer comprising both a mesogenic and a hyperpolarizable component, such as the polymer depicted in FIG. 6 herein. In one embodiment, preferred weight ratios are for (total quasi-liquid ingredients): polymer substantially 1:4. The molecular weight of the polymer may fall within the range of about 20,000 to about 30,000.

In still a further embodiment of the invention, the hyperpolarizable component has no mesogenic component, e.g., 4-dimethylamino-4'-nitrostilbene, and the polymeric mesogenic component has no hyperpolarizable component, e.g., 6-[4-(4-methoxyphenoxycarbonyl)phenoxyhexyl]acrylate homopolymer and 6-[4-(4-cyanophenoxycarbonyl)phenoxyhexyl] acrylate homopolymer, the weight ratio preferably lying within the range 1:20-100.

In another embodiment of the invention, the material comprises two different quasi-liquid crystal components, e.g. the compounds depicted in FIG. 7 herein where R is methoxy (i) and hexyloxy (ii), and a hyperpolarizable component (iii) with no mesogenic components, e.g., 4-dimethylamino-4'-nitrostilbene. In this case, the weight ratio [(i)+(ii)]:(iii) preferably lies within the range 20–100:1 and the weight ratio (i):(ii) is substantially 1:3.

The substrate to be used in the invention should preferably exhibit weak surface electric conductivity such that when 2000 Volts are applied across parallel electrodes which are 2 mm apart, the current flow will be preferably between 0.1 and 30 $\mu$Amp. Certain types of glass, such as Herenz glass, exhibit this suitable conductivity. An unsuitable glass, such as Knittel Glaser glass, may be made suitable when coated with a material that will impart this weak conductivity, such as polyimide.

The materials used in the invention and particularly the compositions described above are made applicable for nonlinear optical applications by the poling process, in which an electric field is applied to the composition possibly at an elevated temperature, when molecular mobility in the composition is more facile, followed by cooling and removal of the electric field. The electric field may be a DC (or polarizing) or AC electric field.

The difference between the present invention and earlier poling studies is that in the present invention a special "in-plane" poling geometry is used, a preferred embodiment of which is described later. This poling geometry might be responsible for the new nonlinear optical effects obtained according to the invention.

It may be noted generally that in the embodiment of the invention combining a hyperpolarizable component with a glass-forming component, the effect of raising the temperature may reversibly change the glassy nature of the glass-forming component, while the hyperpolarizable component is aligned by the imposed electric field. That is to say, on cooling the glass-forming component returns to the glassy state, while the hyperpolarizble component retains its alignment.

It will be apparent that the coatings referred to may be coatings on planar or curved surfaces and that the three-dimensional forms include e.g. waveguides, which may themselves be coated. Persons skilled in the art will be aware in what manner the present invention may be adapted according to the form of the substance through which the beam is transmitted and/or from which it is reflected.

Second order nonlinear optical effects [i.e. all $X^{(2)}$ effects] include besides SHG, by way of example, sum and difference frequency generation, optical parametric oscillation and amplification and the electro-optic (Pockel's) effect. The present invention is also expected to find utilization in the fields of piezoelectrics, fiber optics and waveguides.

While the detailed examples herein describe the transmission of a beam of light, reflection can be obtained from the samples themselves or enhanced by use of coatings of e.g. silver, gold or aluminum, as will be apparent to skilled persons.

It will also be apparent to skilled persons that this invention may be applicable to additional material compositions, such as where the organic glass is replaced by non-organic glasses. It should also be applicable to other materials, such as resins and elastomers which are similar to glasses in that molecules may be poled and immobilized therein, but differ in that this state is formed irreversibly in the former, whereby a mobile state may be restored to glasses.

The new optical effect which characterizes the present invention possesses the notable advantages that strong nonlinear optical effects and SHG signals can be obtained, and that the fact that one can obtain SHG polarized along two perpendicular directions means in turn that phase matched SHG should be feasible, i.e. the fundamental and harmonic propagate through the medium with the same refractive index, enabling the highest SHG conversion efficiency to be obtained.

As will be apparent from the particular illustrative embodiments of the invention described below, if the material in question is subjected to a polarizing electric field along an axis defined as an x-axis of the material, then the emergent radiation modified relative to the input radiation is characterized by one or more $X^{(2)}$ components which contain as their three indices, x as zero or two times and y and/or z as one or three times, such as $X^{(2)}zzz$, $X^{(2)}zxx$ and $X^{(2)}zyy$ and so forth.

The invention provides thus a new means for the production of poled polymer films for second order nonlinear optical applications, in particular second harmonic generation, electro-optical modulation, etc. The advantages and new features of this invention are:

1. Asymmetry and consequently the nonlinear optical properties are induced simultaneously along two directions. Production of nonlinearity perpendicular to the poling direction (i.e. along the z-direction in FIG. 1b) has never been achieved before.

2. Production of extremely high nonlinear optical efficiency along the z-direction, this nonlinearity being caused by a new mechanism, different from that which causes nonlinearity along the x-direction.

The invention can be exploited for applications which either: (a) use the high nonlinear efficiency along the z-direction, or (b) make use of the simultaneous nonlinear optical properties along the two directions.

EXAMPLES

I PREPARATION OF MATERIALS

1. Preparation of PLCP-1

The photochromic liquid crystal polyacrylate depicted in FIG. 6 with n=5 (denoted below by PLCP-1) containing—20% of spiropyran comonomer (x:y=1:4), M.W.=$2.5 \times 10^4$, was prepared by free radical copolymerization in 3:1 toluene-THF solution, as described by Yitzchaik S. et al. Macromolecules (1990) 23:707.

2. Preparation of QLC-1 and QLC-2

The quasi-liquid crystals depicted in FIG. 7 with R=$C_6H_{13}O$— and $CH_3O$— (denoted by QLC-1 and QLC-2, respectively) were synthesized as described by Shvartzman F. P. and Krongauz, V. (J. Phys.Chem. (1984). 88:6448). The disclosure of this publication is incorporated herein by reference.

Figure 8:
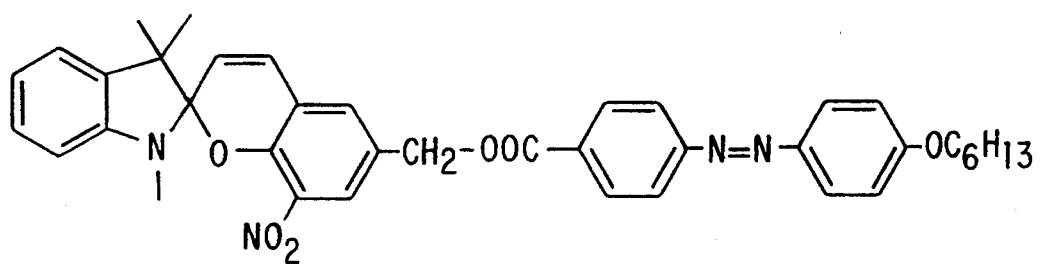
FIG. 8 depicts the formula of the compound designated AzISP.

3. Preparation of 2',3'-dihydro-8-nitro-6-[4-(4'hexyloxyphenylazo)-phenylcarbonyloxymethyl]-1',3',3,-trimethyl-spiro(2H-1-benzopyran- 2,2') indole (AzISP) (see FIG. 8)

(a) 5-chloromethyl-3-nitrosalicylaldehyde 1.79 g. (0.01 mole) of 5-chloromethylsalicylaldehyde, prepared according to Angyal, S. J. et al., J. Chem. Soc. 1950, 2145, was dissolved in 20 ml. of glacial acetic acid. To this solution there was added a solution of 0.63 g. fuming nitric acid in 10 ml. glacial acetic acid over 30 minutes, keeping the mixture at 30° C., followed by stirring at 30° C. for 2 hours. The solution was then poured over ice to give a precipitate which was crystallized from methylene chloride giving the title product. Another crop was obtained by extraction of the aqueoue phase, drying with anhydrous sodium sulfate, evaporation and crystallization from methylene chloride. Total yield: 53%.

(b) 2',3'-dihydro-8-nitro-6-hydroxymethyl-1',3',3'-trimethylspiro (2H-1-benzopyran-2,2')indole)

To a solution of the product of part (a) (1.21 g, 4.26 mmol) and 0.75 ml. commercially available Fisher base in 11 ml. absolute ethanol, 1,3,3-trimethylindoline was added, the mixture refluxed for 30 minutes, and the ethanol was removed by evaporation. The residue was chromatographed on silica and eluted with ethyl acetate to give the title product in 30% yield.

(c) AzISP

To a solution of the product of part (b) (0.15 g) and 4-(4'-hexyloxyphenylazo) benzoic acid (0.14 g) (prepared according to Hall, H. K. et al., Macromolecules, 1989, 22:3525), in dry tetrahydrofuran, there were added 88 mg dicyclohexylcarbodiimide and 5 mg dimethylaminopyridine. The mixture was stirred for 24 hours at room temperature, filtered, and the solvent removed by evaporation. The residue was chromatographed on silica and eluted with 1:5 ethyl acetate/hexane, to give the title product.

4. Preparation of the DR-PMMA copolyer (Disperse Red-Polymethylmethacrylate)

Figure 9:
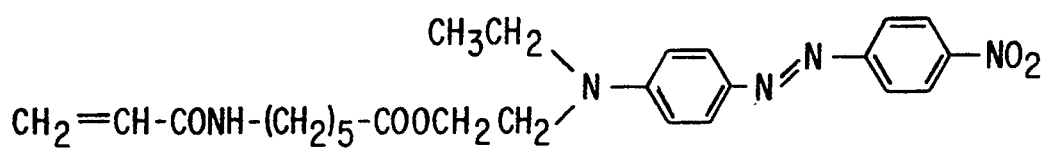
FIG. 9 depicts the formula of the ester of Disperse Red (DR) used as a comonomer.

This copolymer is prepared by copolymerization of commercial methyl methacrylate monomer with the ethylenically unsaturated monomer depicted in FIG. 9 which incorporates a hyperpolarizable chromophore. This monomer is obtained by esterification of Disperse Red (Aldrich) with 6-acryloylaminohexanoic acid (prepared according to Cabrera, I. and Krongauz, V., Macromolecules (1987), 20:2713) and commercially available dicyclohexylcarbodiimide for 18 h at room temperature, after which the reaction mixture was poured into water. The crude product was purified by flash chromatography.

The monomer of the formula given in FIG. 9 was then copolymerized with methyl methacrylate in tetrahydrofuran at 60° C. for 13 h. The molar feed ratio of the two monomers was 10:90 (i.e. excess of methyl methacrylate). The solution contained 10% total monomers by weight, and 2% of the initiator AIBN (azoisobisbutyronitrile). Prior to reaction, the solution was thoroughly outgassed by the conventional freeze-thaw technique, and then sealed under vacuum. The copolymer product was purified by two reprecipitations from methanol, and then dried under vacuum. Yield:40%. The polymer glass transition temperature was 82° C.

The composition of the polymer was determined by dissolving the polymer in tetrahydrofuran and measuring the UV-visible absorption of the azo group. It was thus determined that the content of the hyperpolarizable species in the copolymer product was 4 mole %.

II FILM PREPARATION

Preparation of polymer and QLC films and their alignment in an electric field have been described previously by Cabrera I. and Krongauz V. (Nature (1987) 326:582 and Macromolecules (1987), 20: 2713), and by Shvartsman, F. P. and Krongauz, V. (J.Phys.Chem. (1984), 88:6448). The disclosure of these publications are incorporated herein by reference.

In FIG. 1A (top view) and 1B to 1F (side views), a film 2 of the material being examined for SHG measurements was prepared by casting from, e.g., benzene-THF solution (2:1) onto a hot ($\sim 80°$) glass slide 4, onto which parallel thin film electrodes 6 had been deposited 2 mm apart. After casting, the film is dried in vacuum at 45° C. for 2 h.

The ratio between the thickness of the electrodes and of the material lies within the range of from 1:3 to 1:800, preferably from 1:7 to 1:500 and most preferably from 1:20 to 1:200.

In a preferred embodiment of the invention the electrodes are about 300 Angstroms thick (i.e. in the z direction), while the film of material which covers both the electrodes and the space between them, is a few microns thick, e.g. 0.2-20 $\mu$. This geometry ensures that the poling field is always in the plane of the film.

Films are poled by applying a voltage of 2-2.5 kV across the electrodes, equivalent to an electric field of $\sim 10$ kV/cm, when the film is either at room temperature or at a temperature above the glass transition temperature ($T_g$) but below the clearing temperature ($T_c$). The film is then cooled to room temperature before removing the field.

Samples containing PLCP-1 or QLC were simultaneously irradiated, imparting a deep red colour indicative of a considerable presence of the merocyanine form of these materials. This color slowly faded over 1-2 weeks.

III MEASUREMENTS

Methods of material characterization and film examination, including gel permeation chromatography, differential scanning calorimetry (DSC), polarization microscopy and optical absorption have been described in the prior art.

The experimental system for SHG is depicted in FIG. 2. A Neodymium-YAG laser 10 (Spectra-Physics DCR-11) provides 8 ns pulses of 1064 nm radiation at a repetition rate of up to 10 Hz. Only a small amount (usually 0.1-6 mJ/pulse) of the available laser pulse energy is utilized, and the laser beam is weakly focused to a diameter of 1-2 mm. at the sample 20. It will be appreciated that in accordance with the present invention, the input beam may be directed at the sample at any angle other than normal to the plane of the imposed DC electric field. In the exemplified embodiment, the slide on which the sample of material is mounted may for this purpose be placed at a fixed angle (such as—merely by way of example—at 30° or 45° to the incident beam of light, or for comparative purposes at 90° thereto. In an alternative embodiment (not illustrated), the slide may be rotated by any conventional means, such as a rotating mount, to achieve the desired angle relative to the incident beam; in a further possible alternative embodiment (not illustrated), conventional means (such as a prism) may be interposed between item 18 and the sample in order to bend the incident light to the desired angle, in which case it would be convenient to interpose also similar conventional means between the sample and item 22 (below) in order to bend the emergent light back again in order to be processed as described. The laser polarization can be varied using a lambda /2 plate 14 and a polarizer 16. The input cut-off filter 18 (Schott RG-610) eliminates any harmonic radiation which may have been produced by the laser or optical components. After passing through the sample in the region between the electrodes (denoted 8 in FIG. 1), the fundamental beam is blocked by the output filter 22 (Schott BG-39) which transmits any generated 532 nm radiation through a polarizer 24, a medium resolution monochromator 28 (Jobin Yvon H20-UV) and a high gain photomultiplier 30 (RCA 8575). A quartz wedge depolarizer 26 is employed to eliminate any dependence of detection efficiency on polarization. The PMT output is amplified 25 fold at preamplifier 32, and analyzed by a gated photon counter 34 (Stanford Research SR 400) gating synchronously with the laser pulse. Where necessary the signals were reduced in a controlled manner [by means of attenuator 12 on the input side and/or by an attenuator (not shown) on the output side] so that the photon counter registered an average count rate of $\leq 0.4$ photons/pulse. Typically, signals were averaged over about 1000 pulses. It was verified that the detector response arose from genuine SHG by checking that signals sclaed with the square of the input laser intensity; and that the signals vanished when the detection monochromator was detuned from 532 nm., or when the detector gating was not synchronous with the laser pulse, or when the sample was removed.

In all experiments recorded, SHG was measured at room temperature in transmission with the electric field alignment direction (designated the x axis) vertical, and sample xy plane (and thus also the plane of the electric field) at either 10° to 70°, preferably at 45°, or normal to the input laser.

Thus, the latter geometry (normal to the input laser), which was employed by Hsiung H et al. (J. Chem. Phys. 1987, 87:3127), can only probe the in-plane $X^{(2)}$ components (i.e., those with only x and y indices). In the 45° geometry (in accordance with an embodiment of the present invention) a horizontal fundamental or harmonic field therefore contains a component in the y and z directions, thus also accessing $X^{(2)}$ components with z indices.

During some SHG measurements an electric field was simultaneously reapplied across the electrodes (the sample was kept at room temperature). The electric field applied during SHG measurements did not exceed that applied during sample preparation.

The small thickness of the samples (about 1-2 m.) meant that reabsorption of 532 nm. light via the tail absorption of the merocyanines or other hyperpolarizable species was not a significant problem, and since such thicknesses are less than typical coherence lengths, destructive interference effects (Maker fringes) should be avoided (Mortazavi, M. A. et al., J. Opt. Soc. Amer. B 1989, 6:733; Meredith G. R. et al., Macromolecules 1982, 15:1385, and Nonlinear Optical Properties of Organic and Polymeric Materials, ACS Symposium Series No. 233, Washington 1983:109). The disclosure of these publications are incorporated herein by reference.

IV DISCUSSION OF RESULTS

Second Harmonic Generation

It has been found that when certain compositions of materials are poled as described above, they exhibit SHG via $X^{(2)}$ components other than those expected according to results found by earlier workers ($X^{(2)}xxx$, $X^{(2)}xyy$, $X^{(2)}xzz$, $X^{(2)}zxx$, $X^{(2)}yxy$). In particular, this is demonstrated by the generation of SHG, in which a horizontally polarized fundamental generates a horizontally polarized SHG signal. SHG so produced is hereinafter denoted $I_{h-h}$; vertically polarized SHG induced by a vertically polarized fundamental is similarly denoted $I_{v-v}$, and horizontally polarized SHG induced by a vertically polarized fundamental is denoted $I_{v-h}$.

Figure 3:
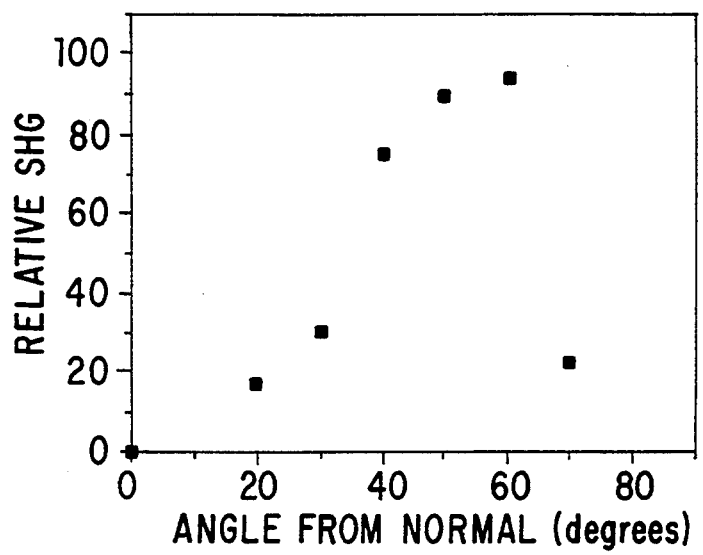
FIG. 3 illustrates the angular dependence of SHG of a 2% DANS-PMMA blend.

The $I_{h-h}$ signal was usually demonstrated when the sample was placed so that its xy plane was at 45° to the input laser, but can be observed for any incidence angle other than normal to the laser beam (See FIG. 3).

As described above, our samples were prepared by electric field poling (in the plane of the sample) at elevated temperature, followed by cooling to room temperature before removing the electric field. After a certain time interval (ranging from minutes to days) SHG from the sample was examined in the absence of any applied DC field. It was observed that some samples already exhibited $I_{h-h}$ SHG under these conditions, whereas others only showed this effect when a DC electric field was reapplied at room temperature. The DC electric field was obtained by applying a voltage of 2000-2500 volts between the electrodes, which are 2 mm. apart. The $I_{h-h}$ signals at 45° incidence from various samples are presented in Table 1; the $I_{v-v}$ signals are also presented for comparison.

Measurements were made with different compositions displaying $I_{h-h}$ SHG, each representing a different combination of glassy and hyperpolarizable species, as follows:

2% DANS-PMMA: a blend of a hyperpolarizable species and an amorphous polymer;

DR-PMMA: an amorphous copolymer incorporating the hyperpolarizable species;

AzISP: a glass formed by a non-polymeric molecule which incorporates a hyperpolarizable chromophore;

2%DANS-HOMO-1: a blend of a hyperpolarizable species and a liquid crystal polymer;

PLCP-1: a liquid crystalline copolymer incorporating the hyperpolarizable species; and QLC: a nematic glass formed by a non-polymeric molecule which incorporates a hyperpolarizable chromophore.

The PLCP-1-QLC-1 blend demonstrates that mixtures of two of the above combinations may also be used.

Key to the Abbreviations

PLCP-1 = photochromic liquid crystal polyacrylate of FIG. 6 with n=5 containing ~20% of spiropyran comonomer (x:y=1:4), M.W.=25,000

QLC-1 = quasi-liquid crystals of compound of FIG. 7 with R=$OC_6H_{13}$

QLC-2 = quasi-liquid crystals of compound of FIG. 7 with R=$OCH_3$

PMMA = polymethyl methacrylate

DANS = 4-dimethylamino-4'-nitrostilbene

HOMO-1 = 6-[4-(4-cyanophenoxycarbonyl)phenoxyhexyl]acrylate homopolymer

DR = Disperse Red derivative of FIG. 9.

TABLE 1

RELATIVE SHG SIGNAL STRENGTHS

| | No Field[1] | | In DC Field $1 \times 10^4$ V/cm[1] | | |
|---|---|---|---|---|---|
| | $I_{v-v}$ | $I_{h-h}$ | $I_{v-v}$ | $I_{h-h}$ | $I_{v-h}$ |
| pure PMMA | <0.1 | <0.1 | <0.1 | <0.1 | <0.1 |
| 2% DANS-PMMA* | 40 | 3 | 200 | $3 \times 10^4$ | n.r. |
| DR-PMMA copolymer | 10 | 40 | 30 | $1 \times 10^3$ | n.r. |
| AzISP | <0.5 | 1 | 30 | $2 \times 10^4$ | n.r. |
| 2% DANS-HOMO-1* | 0.8 | <0.1 | 1600 | 1000 | n.r. |
| PLCP | 1-2 | <0.1 | 5-10 | 40-60 | n.r. |
| QLC.1-QLC.2 1:3* | 0.4-1. | <0.1 | 10-30 | 300-900 | 150 |
| PLCP-QLC.1 4:1* | 3-10 | <0.1 | 20-30 | 400-800 | 100 |

* = blends; n.r. = not recorded ([1]) In all samples, both with and without the field, $I_{h-v}$ signals were not observed.

In Table 1, $I_{v-v}$=signal for vertically polarized input, vertically polarized SHG output; $I_{v-h}$=vertically polarized input, horizontally polarized SHG output, etc. It should be noted that some scatter of signal strengths is observed from different samples of nominally identical composition; this may be attributed to small differences in thickness and alignment.

SHG is observed from all samples containing hyperpolarizable material; no signal is obtained from (e.g.) pure PMMA. From the dependence of the $I_{h-h}$ signal on the incidence angle (see Table 2 and FIG. 3), it is seen that no signal is observed at normal incidence. Since at normal incidence the horizontally polarized direction is exactly parallel to the sample y axis, it is concluded that the samples retain isotropy along their y directions.

Consequently, the $I_{v-h}$ signal at non-normal incidence is attributed to asymmetry along the sample z axis, i.e., the direction normal to the film plane. It should be noted that the observation of a maximum $I_{h-h}$ signal for incidence at approximately 60° to the normal is also consistent with the $X^{(2)}zzz$ term making the dominant contribution to the $I_{h-h}$ signal. It can be similarly concluded that the $I_{v-h}$ signal arises from the $X^{(2)}zxx$ component.

By comparison with the SHG signal of a standard single crystal of quartz, it was found that the strongest $I_{h\text{-}h}$ signal strengths (with the electric field) correspond to $X^{(2)}zzz$ between $10^{-8}$ and $10^{-9}$ esu/cm$^3$.

When the sample was normal to the input laser beam, $I_{h\text{-}h}$ and $I_{v\text{-}h}$ signals were not observed either with or without an applied DC field. The $I_{v\text{-}v}$ signal was again observed in the absence of the DC field, which increased when the field was applied. Typical results are shown in Table 2.

TABLE 2

RELATIVE SHG SIGNAL STRENGTHS AT 45° AND NORMAL INCIDENCE

| | No field | DC Field $1 \times 10^4$ V/cm | | |
|---|---|---|---|---|
| | $I_{v\text{-}v}$ | $I_{h\text{-}h}$ | $I_{v\text{-}v}$ | $I_{v\text{-}h}$ |
| PLCP-QLC-1 4:1* | | | | |
| sample at 45° to beam | 3 | $5 \times 10^2$ | 20 | $1 \times 10^2$ |
| sample at normal to beam | 3 | 0.4 | 20 | 0.1 |

The appearance of the strong $I_{h\text{-}h}$ and $I_{v\text{-}h}$ signals in the electric field was unexpected, since the electric field is applied in the vertical direction only, and thus is not expected to induce asymmetry in either of the horizontal directions y or z. These signals did not vanish immediately when the DC field was shut off, thus eliminating the possibility that they were due to a $X^{(3)}$ process originating in either the sample or the substrate, and confirming that they were from a $X^{(2)}$ process whereby horizontal asymmetry is induced. The signals did however disappear eventually after the DC field was shut off, the rate of decay varying from sample to sample. Typically this happened over minutes to days. However, the signal could generally be restored again by re-applying the DC electric field.

Figure 4:
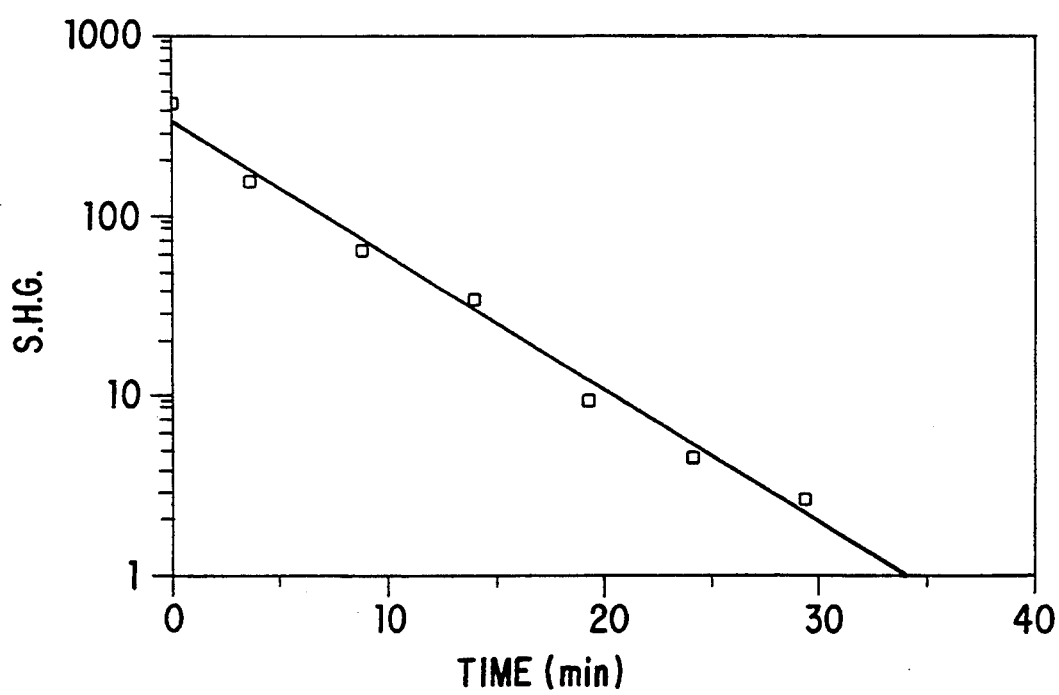
FIG. 4 shows decay of $I_{h-h}$ SHG signal of a QLC-1-QLC-2 1:3 blend following removal of the electric field.
Figure 10:
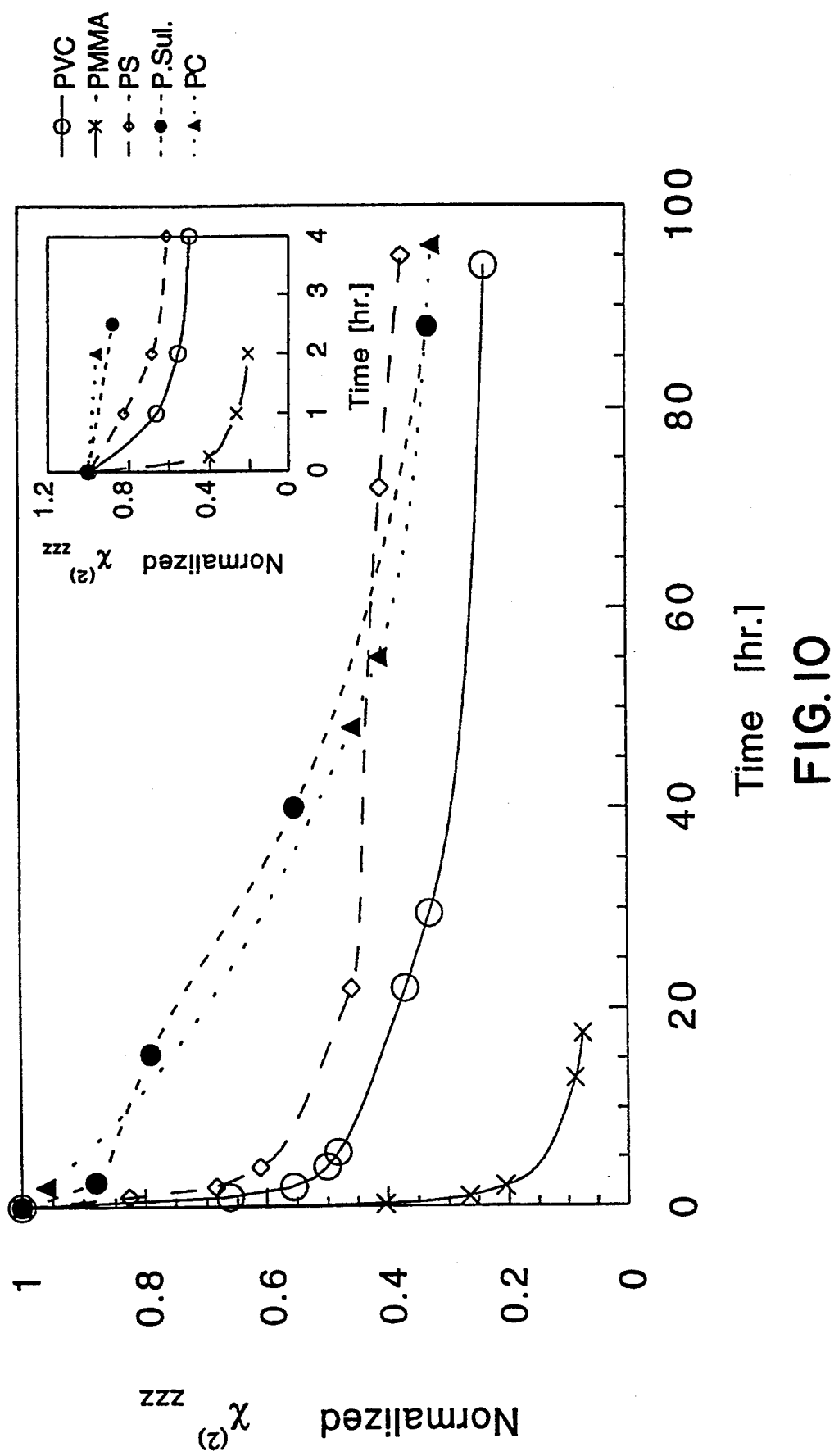
FIG. 10 compares the decay rates of the loss of the $X_{zzz}^{(2)}$ nonlinearity for blends of 2% DANS in various amorphous polymers after the application of the electric field. The insert shows a larger scale of the decay from 0 to 4 hours.

Decay of the $I_{h\text{-}h}$ signal in a QLC-1 - QLC-2 blend, after turning off the DC field, is shown in FIG. 4. Different decay characteristics are observed in different systems. FIG. 10 shows the decay of the $I_{h\text{-}h}$ signal for blends of 2% DANS in various amorphous polymers: polyvinylchloride (PVC), polymethylmethacrylate (PMMA), polystyrene (PS), polysulfone (P. Sul.) and polycarbonate (PC). Widely different decays are observed.

Figure 5:
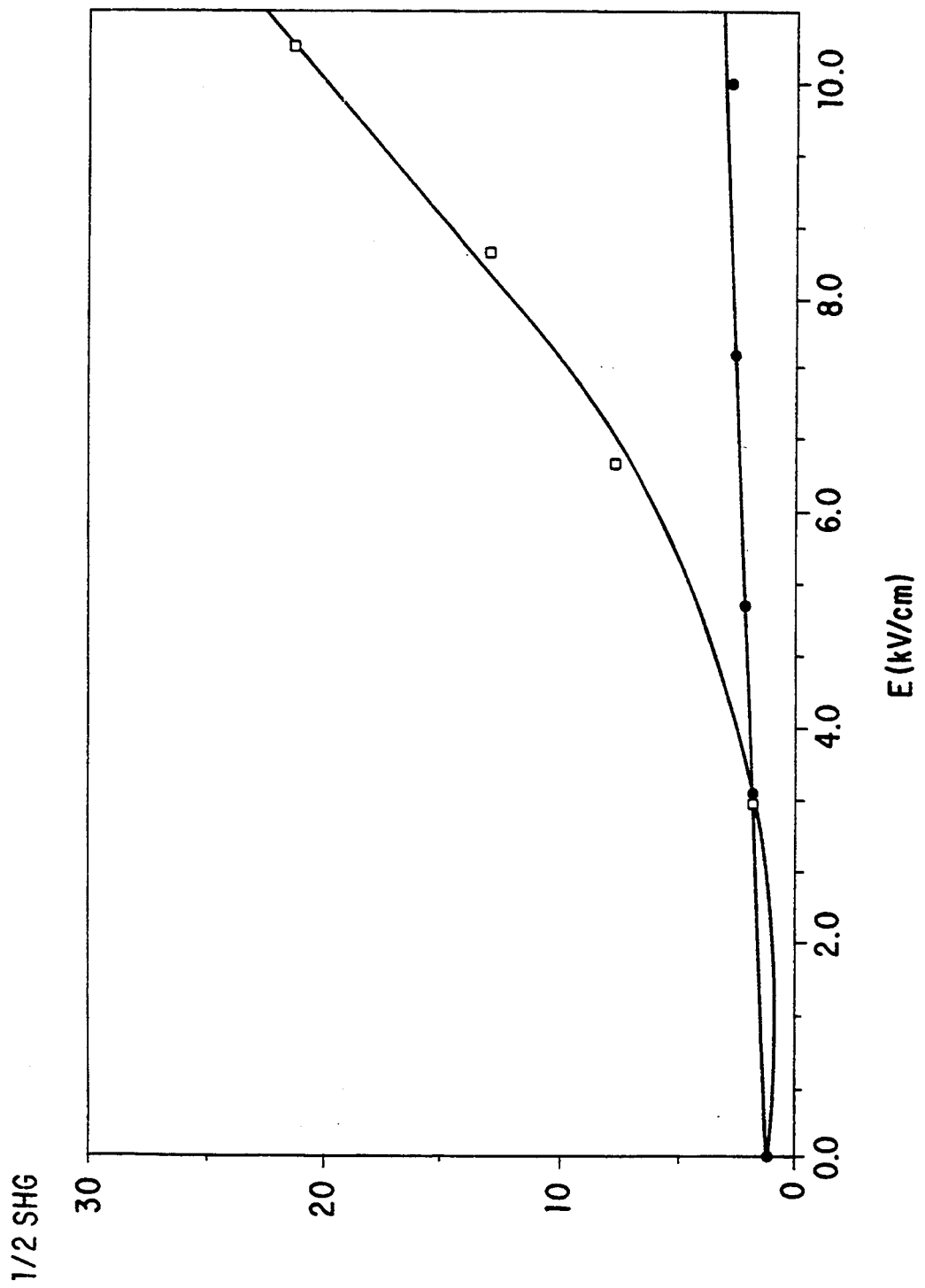
FIG. 5 shows dependence of $I^{0.5}_{v-v}$ (V) and $I^{0.5}_{h-h}$ (H) signals of the QLC-1–QLC-2 1:3 blend on the applied electric field.

Furthermore, it is noted that the dependence of the $I_{h\text{-}h}$ and $I_{v\text{-}v}$ signals on the electric field is different (see FIG. 5). $I^{0.5}_{v\text{-}v}$ ($X^{(2)}$xxx) increases relatively slowly and linearly with the electric field, in agreement with the work of Hsiung H. et al., loc cit. and the expected behavior for interaction between isolated dipole moments and a DC electric field. The $X_{zzz}^{(2)}$ component, however, shows a different behavior, which in the range studied can be fitted well by $I^{0.5}_{h\text{-}h}$ proportional to the square of the electric field (see FIG. 5).

While the present invention is not to be construed as limited by any theory, it is presently believed that the presence of dimers and/or higher aggregates of the hyperpolarizable species may be responsible for the $I_{h\text{-}h}$ SHG.

Another important factor in the production of the $I_{h\text{-}h}$ SHG may be the formation and migration of electric charges in the medium brought about by applying the DC electric field. Therefore, additional additives or treatment of the system which changes the charge transport properties might either enhance or depress the $I_{h\text{-}h}$ effect. In experiments when the film is of 2% DANS-PMMA (blend) cast on 1 μm thick film of polyimide on glass (FIG. 1D) strong $I_{h\text{-}h}$ signals are observed ($X_{zzz}^{(2)} = 1.5 \times 10^{-8}$ esu/cm$^3$). Casting 1 μm thick films of Nylon 6, Polyamide Urea or Polyamide Urethane produced weak $I_{h\text{-}h}$ signals ($X_{zzz}^{(2)} \leq 4 \times 10^{-11}$ esu/cm$^3$). Furthermore, the ratio of the thickness of the electrodes to the thickness of the film may be a very important parameter.

V FURTHER EXPERIMENTS AND RESULTS

In this experiment we show further manifestations of this interesting new nonlinear effect, including enhanced control of the phenomenon, both in magnitude and stability, with particular reference to the electrical properties of the host polymer employed. Variation of the polymer matrix can lead to much longer retention (i.e. slower decay) of the nonlinearity both parallel and perpendicular to the applied field. The polymer matrix, the substrate and the metallic electrode material can all strongly affect the nonlinearity induced by in-plane poling, in contrast to their rather minor effect on the conventional dipolar poling mechanism. These influences can be related to the charge injection and retention properties of the media. Our results show that the magnitude and stability of the NLO coefficients which can be produced by charge injection in the "in-plane" geometry can potentially rival those produced by poling in sandwich geometries, despite the much weaker poling fields employed.

Parallel strip electrodes, 2 mm apart, are evaporated onto cleaned glass slides to a thickness of about 500 Å. (In experiments described in section C the glass slides were precoated in order to modify the substrate surface—see FIG. 1). The standard electrode material is aluminium, and we also present for comparison results using other metals. The slides were then coated by dipping into the appropriate polymer/dye solution (solvent THF) and drying under reduced pressure at 60° C. for 24 h, and then at room temperature for another week. All polymers employed were samples of commercial origin.

Samples were activated for second harmonic generation (SHG) measurement only by application of high voltage (2 kV) across the electrodes at room temperature for 10 minutes. The current flow through the sample during the application of the voltage was recorded. SHG measurements, using a pulsed Nd:YAG laser, were performed on completion of the charging process, and at later times to monitor the SHG decay. By placing the sample plane at 45° to the laser propagation, the nonlinearity parallel and perpendicular to the direction of the DC electric field is measured using s- and p-polarized laser light respectively. The magnitude of the SHG response is converted to a nonlinear susceptibility by the accepted procedure of calibration against quartz. In accordance with our convention, the x direction in the sample is the direction along which the DC electric field is applied, and the z direction, normal to the film plane, is that along which this new phenomenon of charge injection induced SHG is observed.

RESULTS

A. Magnitude of SHG of Films Containing DANS Dissolved in Different Polymers

The efficiency of various polymeric hosts in producing nonlinearity perpendicular to the applied field is demonstrated here. Films containing 2% by weight DANS were prepared in: Polymethyl-methacrylate (PMMA), Polycarbonate (PC), Polystyrene (PS), Polyvinyl-chloride (PVC), and Polysulphone (P.Sul).

After applying the DC field of $10^4$ V/cm at room temperature, the SHG measurements were performed (Table 3); nonlinearity perpendicular to the applied field is designated by $X_{zzz}^{(2)}$, and nonlinearity parallel to the field is given by $X_{xxx}^{(2)}$. Application of the field only at RT (as compared to $T_g$) may somewhat facilitate the charge injection induced nonlinearity ($X_{zzz}^{(2)}$) as opposed to the dipolar nonlinearity $X_{xxx}^{(2)}$.

Generally the SHG signals along the z-direction ($X_{zzz}^{(2)}$) are higher by the order of 20-40 compared to the x-direction ($X_{xxx}^{(2)}$). Polymers with higher or lower glass transition temperatures ($T_g$) than PMMA show smaller $X^{(2)}$ values. We also see that the absorption maximum of the DANS varies somewhat from host to host; all these absorptions are red-shifted with respect to the solution maximum in THF (430 nm).

TABLE 3

Comparison of the nonlinearity induced by 'in-plane' poling of blends of 2% DANS in various polymers.*

| MATRICES | $T_g$ [°C.] | $\lambda_{max}$ [nm] | $X_{zzz}^{(2)}$ [$10^{-9}$ esu] | $X_{xxx}^{(2)}$ [$10^{-9}$ esu] |
|---|---|---|---|---|
| Poly methyl methacrylate (PMMA) | 109 | 438 | 15 | 0.40 |
| Poly vinyl chloride (PVC) | 88 | 448 | 11 | 0.27 |
| Polycarbonate (PC) | 149 | 442 | 8 | 0.21 |
| Polystyrene (PS) | 92 | 437 | 6 | 0.13 |
| Polysulphone (P.Sul) | 188 | 447 | 5 | 0.16 |

*The pure polymer glass transition temperature and the absorption maximum of DANS in each matrix are also given. Note that addition of DANS caused a small change in $T_g$.

The magnitude of the $X_{(zzz}^{(2)}$=nonlinearity ($2*10^{-8}$ esu) appears to be the highest ever reported for polymers exposed to a field of only $10^4$ V/cm.

B. Decay of SHG of DANS in Polymeric Matrices

After removing the field, the poled film is not at thermodynamic equilibrium, and generally the SHG will decay due to the tendency of the system to relax to equilibrium. However, the rate of SHG decay is controlled by kinetic factors. In conventional poling (nonlinearity induced by dipolar alignment of the dyes), once the DC electric field is removed, dopants in the regions of sufficient mobility and local free volume are free to rotate out of the imposed orientation, thus diminishing the symmetry breakage.

For $X_{zzz}^{(2)}$ nonlinearity, which is attributed to an asymmetric distribution of charged dye species, nonlinearity is lost after removal of the field due to current discharge.

The SHG decay was measured for the different polymer matrices. FIG. 10 illustrates the decay of the $X_{zzz}^{(2)}$ nonlinearity of 2% DANS in various polymer matrices. For each matrix, the decay is normalized relative to the value of the nonlinearity recorded immediatly after turning off the high voltage. The decay during the first 4 hours is shown in more detail in the insert. Curves joining the data points are for guidance only. As shown in FIG. 10, the decay in four polymer hosts (P.Sul, PC, PS and PVC) is much slower than in the "model" host PMMA. Decay cannot be fitted by simple exponential behavior.

C. Effect of Different Substrates and Charging Current in the 'In-plane' Geometry In this section we show how changing the substrate onto which a 2% blend of DANS/PMMA is cast can drastically change the $X_{zzz}^{(2)}$ nonlinearity. We further show how these differences can be correlated with the charging current which flows along the substrate surface during the application of the high voltage.

Our starting point for examining the effect of different substrates was the comparison of two glass slides obtained from different manufacturers—Herenz and Knittel Glaser—and denoted type I and type II, respectively. (Experiments described in other examples of this application were performed on the type I glass). Samples were prepared by casting 2% DANS/PMMA on both types of glass. It was observed that after application of the high voltage, samples on type II glass yielded very low $X_{zzz}^{(2)}$ nonlinearity as opposed to the high $X_{zzz}^{(2)}$ nonlinearity on type I glass.

In order to examine more fully substrate effects we also prepared samples on the following substrates (see FIG. 1):

type I glass coated with 2% by weight tetramethylammonium-bromide, which has been shown to inhibit $X_{zzz}^{(2)}$ formation by charge 'scavenging' (structure of FIG. 1D).

type II glass covered with an approximately 1000 A° thick layer of Polyimide (PI), octadecyl-trichlorosilane (OTS), Nylon 6, Polyamide-Urea (PAUrea), Polyamide-Urethane (PAUrethane) or Mylar, a commercial Polyethylene-Terephthalate (structure of FIG. 1D).

a "reverse geometry" where the DANS/PMMA film was cast on plain glass, and electrodes were evaporated on top of the film. This enables us to compare charge injection along the PMMA/air interface to that along the PMMA/substrate interface (structure of FIG. 1C).

Table 4 presents the results of these experiments. Glass type 1 is an efficient substrate for producing strong $X_{zzz}^{(2)}$. Treating it with a surface scavenger reduces the $X_{zzz}^{(2)}$ values by two orders of magnitude, from $20*10^{-9}$ esu to $0.2*10^{-9}$ esu. Glass type II is a "bad" substrate with $X_{zzz}^{(2)}=0.08*10^{-9}$ esu, but coating it with Polyimide converted it into a "good" substrate with $X_{zzz}^{(2)}$ of $15*10^{-9}$ esu. So by simply modifying the sample substrate we can drastically change the nonlinear response. A "good" substrate can be converted into "bad" substrate and vice versa. The different behavior of the two glass types, I and II, can be attributed to different surface conductivities, which we asume to arise from different manufacturing and cleaning procedures in the two glass samples.

A connection exists between the charging current and the nonlinearity in the z-direction. In the first and forth substrates (glass type I, and type II coated with PI) the charging current is high and so is $X_{zzz}^{(2)}$. In the slide covered with the surface scavenger the nonlinear response is only moderate, as in the current, while on type II glass the current is so low that the $X_{zzz}^{(2)}$ ($=0.1*10^{-9}$ esu) is even higher than $X_{zzz}^{(2)}$.

On OTS, Nylon, PaUrea and PAUrethane substrates, the current is similarly too small to induce an effective charge gradient. In those samples we also measured higher values of $X_{zzz}^{(2)}$ than of $X_{zzz}^{(2)}$. On the other hand, substantial current is observed in the "reverse geometry" i.e. along the PMMA/air interface, and a significant $X_{zzz}^{(2)}$ is obtained.

TABLE 4

Charging current measured at various times during the application of 2000 V to various samples*.

| Substrate | Current [μA] after charging for | | | | | $X_{zzz}^{(2)}$ [$10^{-9}$ esu] | $X_{xxx}^{(2)}$ [$10^{-9}$ esu] |
|---|---|---|---|---|---|---|---|
| | ½ min. | 1 min. | 2 min. | 5 min. | 10 min. | | |
| Glass type I | 16.2 | 15.1 | 13.4 | 12.2 | 10.7 | 20 | 0.3 |
| Glass type I + surface scavenger | 4.2 | 3.9 | 3.0 | 2.4 | 1.9 | 0.2 | |
| Glass type II | 0.64 | 0.18 | 0.23 | 0.19 | 0.22 | 0.08 | 0.1 |
| Glass type II + PI | 10.4 | 6.1 | 2.8 | 1.2 | 0.9 | 15 | 0.4 |
| OTS | 0.03 | 0.03 | 0.03 | 0.02 | 0.02 | 0.06 | 0.07 |
| Nylon 6 | 1.2 | 0.95 | 0.64 | 0.42 | 0.28 | 0.04 | 0.08 |
| PAUrea | 0.26 | 0.24 | 0.20 | 0.16 | 0.13 | 0.04 | 0.06 |
| PAUrethane | 0.74 | 0.60 | 0.44 | 0.29 | 0.20 | 0.03 | 0.07 |
| "Reverse Geometry" | 30 | 15.5 | 7.0 | 2.4 | | 3.4 | 0.04 |

*The nonlinear susceptibilities were measured at the conclusion of the charging process (10 minutes). The "reverse geometry" is as depicted in FIG. 1.

A comparison between the charging currents shows that the current in the first 30 seconds should be about 10 μA in order to gain effective SHG signals. In all the examined samples covered with PMMA+DANS, the building up of the SHG signal took about 20 to 30 seconds, and another 30 seconds were needed to reach equilibrium values. In samples containing the PI substrates, high nonlinearities were observed by 'in-plane' poling at room temperature, whereas application of the field at 100° C. produced a low $X_{zzz}^{(2)}$ value ($0.37*10^{-9}$ esu). These observations, supported by a current measurement at 100° C., suggest that at high temperature the PI layer has higher conductivity, and the charge gradient cannot effectively build up. When the layer was cooled, it regained its previous conductivity which is effective for producing high $X_{zzz}^{(2)}$.

In conclusion we postulate that at room temperature a current of 5-20 μA, after 30 sec. of charging, is needed for producing a strong $X_{zzz}^{(2)}$ response. This current is much stronger than the discharge currents (pA) measured after turning off the field, indicating that only a small fraction of the injected charge actually becomes trapped inside the polymer.

D. Effect of Electrode Metals on the Signals

TABLE 5

Effect of different electrode metals on the nonlinear susceptibilities of films of 2% DANS in PMMA cast on polyimide covered glass.

| Metal | Work function[a] [ev] | $X_{zzz}^{(2)}$ [$10^{-9}$ esu] | $X_{xxx}^{(2)}$ [$10^{-9}$ esu] |
|---|---|---|---|
| Al | 4.28 | 28 | 0.67 |
| Cu | 4.65 | 17 | 0.56 |
| Au | 5.10 | 12 | 0.24 |
| 80% Ni + 20% Cr | 5.15(Ni), 4.50(Cr) | 12 | 0.46 |
| Ag | 4.26 | 1 | 0.05 |

[a]"Handbook of Chemistry and Physics", 65th edition, p.E-76,77, CRC Press (1985).

The effect of the electrode metal on the SHG signals is examined here. The electrodes were evaporated on glass slides covered with polyimide (PI), as illustrated in FIG. 1, followed by casting of the 2% DANS/PMMA. Measurements were made after exposing to an electric field of $10^4$ V/cm at room temperature for 5 minutes. Results are summarized in Table 5, along with the work function of each metal; there does not appear to be any direct correlation between the work function and the magnitude of the $X_{zzz}^{(2)}$ nonlinearity.

DISCUSSION

The experimental results presented above clearly demonstrate the connection between charge injection and formation of $X_{zzz}^{(2)}$ nonlinearity perpendicular to the applied field direction. Consequently, factors such as the type of host polymer, substrate and metal electrode material can have a strong effect on the magnitude of the nonlinearity. Such parameters are expected to have only small indirect effects (if any) on the formation of nonlinearity by the conventional dipolar alignment mechanism in poled polymers.

The magnitude of the observed $X_{zzz}^{(2)}$ nonlinearity in the various host polymers should be considered at this stage as an empirical observation. It is difficult to associate the observed trends with any particular single property of the polymer. According to our model, this nonlinearity depends on several effects such as charge diffusion, charge retention and tendency of the dye to aggregate, which may all vary independently from polymer to polymer.

CONCLUSIONS

'In-plane' poling with thin electrodes can lead, via charge injection and diffusion, to large optical nonlinearities along a direction perpendicular to the applied field. The amount of charge injection and subsequent nonlinearity depends very strongly on the host polymer, substrate and electrode metal, while retention times vary from host to host. Empirical measurements of the effects of these parameters correlate with the conductivity of the substrate, the amount of charge injection from both the electrodes and equilibration rates of the polymer after removal of the electric field. The magnitudes and temporal stabilities of the nonlinearities perpendicular to the field reported here are slightly inferior to those reported for "conventional" poling at much higher fields of optimized co-polymers. However, our results indicate that 'in-plane' poling depends on many parameters, optimization of which may yield superior and commercially viable nonlinear optical materials.

While certain embodiments of the invention have been particularly described, it will be appreciated by persons skilled in the art that many variations and modifications may be made. The present invention is accordingly not to be construed as limited to such particularly described embodiments, rather its concept, spirit and scope will be understood with reference to the claims which follow.

We claim:

1. Method for the generation of second order nonlinear optical effects, including second harmonic generation, which comprises the steps of:

i preparing a material in an xy planar film or xyz tridimensional form on a substrate and placing in-plane parallel electrodes on top of, inside, above or below said material, such that there is no protrusion of said electrodes into said material or a protrusion of at least one of said electrodes into said material is thinner than said material, wherein said material comprises at least one species of a hyperpolarizable component (a) and at least one species of a glass-forming organic material (b) providing a non-crystalline solid matrix in which molecules are not mobile, said components (a) and (b) being either distinct species or portions of a bifunctional molecule;

ii subjecting said material of step (i) to an electric field essentially along the x-axis thereof; and iii directing a beam of light to impinge on and to be transmitted through said material treated as in step (ii), thus generating second order nonlinear optical effects which are characterized by one or more $X^{(2)}$ components whose indices are zzz, zxx, zyy and permutations thereof.

2. A method according to claim 1 wherein the electric field of step (ii) is a direct current (DC) electric field.

3. A method according to claim 1 wherein the electric field of step (ii) is an alternating current (AC) electric field.

4. A method according to claim 1 wherein the substrate exhibits weak surface electric conductivity.

5. A method according to claim 4 wherein the substrate is glass.

6. A method according to claim 4 wherein the substrate is coated glass.

7. A method according to claim 1 wherein the parallel electrodes are placed below the material.

8. A method according to claim 1 wherein the parallel electrodes are placed inside the material.

9. A method according to claim 1 wherein the parallel electrodes are placed on top of the material.

10. A method according to claim 1 wherein the parallel electrodes are placed onto a coating above the material.

11. Method according to claim 1 wherein said beam of light is directed to impinge on a planar film of said material at an angle other than normal to the xy plane and said second harmonic emergent radiation has at least one component of polarization perpendicular to said direction of polarization induced by the electric field.

12. Method according to claim 1 wherein said material comprises a composition of a hyperpolarizable component (a) and a glass-forming organic material (b) selected from an amorphous polymer, a liquid crystal polymer, and a low molecular weight glass.

13. Method according to claim 1 wherein said material is a bifunctional molecule comprising said hyperpolarizable component (a) chemically incorporated into component (b).

14. Method according to claim 13 wherein said bifunctional molecule comprises a hyperpolarizable chromophore incorporated into a component (b) selected from an amorphous polymer, a liquid crystal polymer and a low molecular weight glass.

15. Method for the production of second order harmonic radiation from materials which have been poled by an electric field, said emergent harmonic radiation including at least one component of polarization perpendicular to the direction of the applied electric field, the method being characterized by the following steps:

i preparing a film of a material on a substrate and placing in-plane parallel electrodes on top of, inside, above or below said material, such that there is no protrusion of said electrodes into said material or a protrusion of at least one of said electrodes is thinner than said material, wherein said material comprises at least one species of a hyperpolarizable component ( a ) and at least one species of a glass-forming organic material (b) providing a non-crystalline solid matrix in which molecules are not mobile, said components ( a ) and (b) being either distinct species or portions of a bifunctional molecule;

ii applying to said film a polarizing electric field parallel to an axis defined as the x-axis of said film; and iii causing light to impinge on the polarized film at an angle other than normal to the xy plane, whereby second order harmonic radiation is produced.

16. Method according to claim 1 wherein the ratio of the thickness of at least one of said electrodes and of said material is within the range of from 1:3 to 1:800.

17. Method according to claim 16 wherein said ratio is from 1:20 to 1:200.

18. System for the generation of second order nonlinear optical effects, including second harmonic generation, which system comprises:

i means for subjecting a material to a polarizing electric field essentially along the x-axis thereof, wherein said material is prepared in an xy planar film or xyz tridimensional form on a substrate and in-plane parallel electrodes are placed on top of, inside, above or below said material, such that there is no protrusion of said electrodes into said material or a protrusion of at least one of said electrodes into said material is thinner than said material, said material comprising at least one species of a hyperpolarizable component (a) and at least one species of a glass-forming organic material (b) providing a non-crystalline solid matrix in which molecules are not mobile, said components (a) and (b) being either distinct species or portions of a bifunctional molecule;

ii means for producing a beam of light and for directing said beam to impinge on and to be transmitted through and/or reflected from said poled material, said beam of light producing and directing means being adapted to cause the impingement of said beam at an angle other than normal to the xy plane; and iii means for detecting and measuring the second order nonlinear optical effects generated which are characterized by one or more $X^{(2)}$ components whose indices are zzz, zxx, zyy and permutations thereof.

* * * * *

UNITED STATES PATENT AND TRADEMARK OFFICE
CERTIFICATE OF CORRECTION

PATENT NO.   :  5,434,699
DATED        :  Jul. 18, 1995
INVENTOR(S)  :  BERKOVIC, et al.

It is certified that error appears in the above-indentified patent and that said Letters Patent is hereby corrected as shown below:

On the title page --

[75]     Inventors:    Garry Berkovic; Valeri Krongauz;
                       Shlomo Yitzchaik, all of Rehovot,
                       Israel; Rami Cohen, Holon, Israel Signed and Sealed this Twenty-first Day of May, 1996

Attest:

BRUCE LEHMAN

Attesting Officer        Commissioner of Patents and Trademarks